(12) United States Patent
Bergmans et al.

(10) Patent No.: US 6,515,812 B1
(45) Date of Patent: Feb. 4, 2003

(54) SERVO FORMAT FOR HARD DISKS, PREFERABLY HARD DISKS

(75) Inventors: Johannes Wilhelmus Maria Bergmans, Eindhoven (NL); Kofi Afolabi Anthony Makinwa, Delft (NL); Johannes Otto Voorman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/553,902

(22) Filed: Apr. 20, 2000

(30) Foreign Application Priority Data

Apr. 20, 1999 (EP) .............................................. 99201246

(51) Int. Cl.$^7$ ................................................ G11B 5/02
(52) U.S. Cl. ......................... 360/48; 360/49; 360/77.08
(58) Field of Search ......................... 360/48, 51, 77.08, 360/49

(56) References Cited

U.S. PATENT DOCUMENTS

| | | | | |
|---|---|---|---|---|
| 5,175,507 | A | | 12/1992 | Roither ........................ 329/304 |
| 5,661,760 | A | | 8/1997 | Patapoutian et al. ......... 375/341 |
| 5,862,005 | A | * | 1/1999 | Leis et al. ..................... 360/27 |
| 6,049,438 | A | * | 4/2000 | Serrano et al. ............... 360/40 |
| 6,118,604 | A | * | 9/2000 | Duffy .......................... 360/48 |

OTHER PUBLICATIONS

"Optimal Burst Frequency Derivation for Head Positioning", by A. Patapoutian, IEEE Trans. Magn., Sep. 5, 1996, vol. 32, No. 5, pp 3899–3901.

"Digital Servo Processing in the Venus PRML Read/Write Channel", L. Fredrickson et al, IEEE Trans. Magn., Sep. 5, 1997, vol. 33, No. 5, pp 2617–2619.

"A Coherent Maximum Likelihood Head Position Estimator for PERM Disk Drives", by H. Yada et al, IEEE Trans Magn., May 3, 1996, vol. 32, No. 3, pp 1867–1872.

"Digital Baseband Transmission and Recording", by J. Bergmans, Boston, Kluwer Academi Publishers, 1996.

"Digital Servo Demodulation in a Digital Read Channel", by D. Reed et al, IEEE Trans. Magn Jan. 1, 1998, vol. 34, No. 1, pp 13–16.

"Two New Equalisation Schemes for High–Density Digital Magnetic Recording Systems with Quad–Phase Modulation Code", by J. Bergmans et al, Electron Letters, Jan. 1990, vol. 26, No. 1, pp 13–14.

"Baud–Rate Data–Aided Timing Recovery for Digital Magnetic Recording Systems with Quadra–Phase Modulation Code", by J. Bergmans, IEEE Trans.Comm., Jun. 6, 1995, vol. 43, No. 6, pp 2012–2015.

(List continued on next page.)

*Primary Examiner*—David Hudspeth
*Assistant Examiner*—Varsha A. Kapadia

(57) ABSTRACT

A new embedded-servo format is proposed for use in disk drives, preferably hard disk drives. It is based on biphase modulation (more generally, p-phase modulation, where p>1) and offers significant advantages, in terms of SNR and timing content, over existing formats. It is shown that for biphase, at the low linear densities typically employed for servo information, near maximum-likelihood performance may be attained by a simple bit-detector consisting of a full-response linear equalizer and a binary slicer. When compared with an optimal detector for the commonly used technique of dibit signalling, a SNR gain of some 4 dB is achieved. The same equalizer may be used as the basis for near-maximum-likelihood Position Error Signal (PES) amplitude estimation and timing recovery. Investigations carried out on a practical servo demodulator based on a 5th order analog filter show that, at typical linear densities, this ideal performance is closely approached. The equalizer has a band-pass character and yields excellent suppression of the effects of thermal asperities and magneto resistive (MR) head asymmetry.

18 Claims, 8 Drawing Sheets

OTHER PUBLICATIONS

"Q.P., An Improved Code for High Density Digital Recording", by J.A. Bixby et al, IEEE Trans. Magn. Nov. 6, 1979, vol. MAG–15, No. 6, pp 1465–1467.

"Dual Digital Transmission System for Multipair Cables Based on Crank–Shaft Coding", by Van Gerwen et al, Electron Letters, Jul. 1984, vol. 20 No. 15, pp 619–621.

* cited by examiner

SERVO FORMAT FOR HARD DISKS, PREFERABLY HARD DISKS

FIELD OF THE INVENTION

The invention relates to a disk apparatus, preferably a hard disk apparatus, comprising a disk provided with a plurality of tracks running parallel to each other on the disk, a track comprising servo fields alternating with data fields, a servo field comprising an AGC field having an AGC signal recorded in it and a Gray code field having an encoded Gray bit sequence recorded in it, a data field for recording a data information signal in it.

DESCRIPTION OF PRIOR ART

Such disk apparatus is known from U.S. Pat. No. 5,661,760, document D1 in the list of related documents that can be found below. Generally, a hard disk is subdivided into a plurality of circular zones. FIG. 20 shows schematically a portion of such a hard disk. In each zone, such as the zones $z_1$, $z_2$, $z_3$ in FIG. 20, data is written/read in circular tracks with a bitrate which is substantially constant, but increases for further outwardly lying zones on the hard disk. This results in a substantially constant data density on the hard disk, because of the fact that the rotational velocity $v_d$ of the hard disk is constant. Each track comprises servo fields alternating with data fields.

The servo fields form so-called servo spokes on the hard disk. Four of such spokes $s_1$ to $s_4$ are shown in FIG. 20. They are in the form of prerecorded servo signals that serve for positioning a read/write head on the hard disk. The servo signals can be recorded on the hard disk in two ways. In one way, the servo signals are written with a constant frequency, irrespective of the radial position on the hard disk. This results in spokes whose width increases for positions lying further outwardly on the hard disk. In such layout, the frequency of the signals in the servo fields thus have no relation with the bitrate of the data written on the hard disk. In a second way, the frequency of the signals in the servo fields have a relation with the bitrate of the data written in the zones. This results, upon average, in shorter servo fields than the servo fields in accordance with the first way described above. FIG. 20 shows the servo fields recorded in accordance with the second way by means of the black areas in the various zones. Further, when recorded in accordance with the first way, the servo fields occupy a portion on the disk indicated by the black portion and the hatched portion, as shown in the spoke $s_1$.

SUMMARY OF THE INVENTION

The invention aims at providing an improved format for the signals in the servo fields on a disk, preferably a hard disk. The invention is applicable in any of the two formats described above. In accordance with the invention, the disk apparatus as defined in the opening paragraph is characterized in that the AGC signal has a frequency $f_{AGC}$ and the Gray bit sequence has a bitfrequency $f_{Gray}$, which frequencies satisfy the following relationship:

$$f_{Gray}/f_{AGC}=n,$$

where n is an integer for which holds $n \geq 1$,
and that the Gray bit sequence has been encoded in accordance with a p-phase modulation code, where p is an integer for which holds p>1.

The invention is based on the following recognition. By using a p-phase modulation code for the Gray bit sequence stored in the Gray code field and preferably also for bit sequences stored in other fields, such as the synchronization field and the auxiliary field (in some publications also named as RROC field), the signal-to-noise ratio is increased, eg. compared to dibit signalling. Further, in combination with the requirement that $f_{Gray}/f_{AGC}=n$, where n is an integer for which holds $n \geq 1$, clock extraction is improved and becomes possible throughout these fields. As a result, the AGC field can be shorter and the so-called ZPR (=zero phase restart) field can be dispensed with. Equivalent relationships exist for the ratios $f_{sync}/f_{AGC}$ and $f_{AUX}/f_{AGC}$, in accordance with the claims 2 and 3, respectively. The ratio n need not necessarily be the same for $f_{Gray}$, $f_{sync}$ and $f_{AUX}$, but preferably they are.

For bi-phase (p=2), preferred values for n are 1 and 2. The choice for the value of n depends on whether a higher density is aimed at, or whether an increased signal to noise ratio is the objective. Higher values for n result in a higher density, but in a decrease in signal to noise ratio. For quad phase (p=4), the preferred value for n is 2. For higher values of n the signal to noise ratio decreases to a less desirable value. Modulation codes for which p=3 are particularly applicable to optical disks.

BRIEF DESCRIPTION OF THE DRAWING

These and other aspects of the invention will be elucidated further in the figure description, in which.

DETAILED DESCRIPTION OF THE PREFERRED EMBODIMENTS

Embedded-servo systems are commonly used in hard-disk drives to determine read/write head position. In such systems, disk area is divided into narrow servo sectors interspersed with data sectors. Head position is then determined by processing the output of the read head as it passes over the servo sectors. Coarse position information is obtained by reading track addresses written in data fields, while fine position information is obtained from a number of PES (Position Error Signal) bursts. The latter will typically consist of periodic magnetization patterns offset radially across the width of the tracks. As the head passes over the various PES bursts, read-head position (with respect to track center) may be determined from the amplitude of the replay signal.

Figure 1:
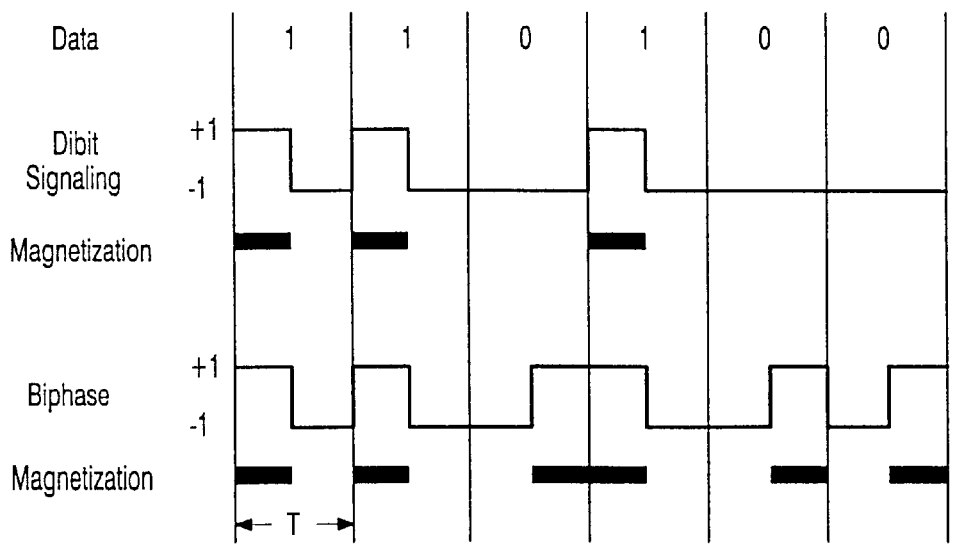
FIG. 1 shows dibit and bi-phase signalling formats.

For the PES bursts, it has been shown, see document D2, that for a Lorentzian head/media system with additive white noise, signal-to-noise ratio (SNR) is maximized at an optimum burst period $T\approx 3.281.t_{50}$ where $t_{50}$ denotes the pulse width at half amplitude. Equivalently, in terms of the normalized information density D, which equals $t_{50}/T$, the system should ideally operate at a density $D\approx 0.3$. This is much lower than the normalized information density in the data sectors, which typically lies between 1.5 and 3. A common method for writing numerical information, such as a track address, in servo sectors is shown in FIG. 1 (top), and will be referred to as dibit signalling. Here a logical '1' bit of data is represented by a dibit, i.e two transitions spaced T/2 seconds apart, and a logic '0' bit of data by a constant magnetization. Bit cells are T seconds long, which ensures a minimum spacing of T/2 seconds between transitions. The bit frequency of the bit sequence of the (user) data is defined as $f_{bit}$, where $f_{bit}=1/T$.

During the replay process each logical '1' will produce a dibit response, i.e. two partially overlapping, Lorentzian-like pulses of opposite polarity, while a logical '0' produces no output at all. Since only one binary symbol 'carries' energy (in the form of transitions), this is clearly sub-optimum from the point of view of SNR.

Biphase modulation is another well known signalling method and is more suitable.

In biphase modulation the second half of each bit cell is simply the inverse of the first half, as shown in FIG. 1(bottom) where bit cells are again T seconds long. Using this rule, two unique bit cell patterns may be generated, corresponding to the two binary symbols. The minimum interval between transitions is the same as for dibit signalling, however transitions are now generated by both binary symbols, indicating a gain in SNR. The periodic magnetization pattern required for the PES bursts may also be regarded as a biphase modulated sequence, obtained for instance by biphase modulating the all ones sequence i.e. '1,1,1 . . . 1'. The resulting burst has a period of T seconds. A useful property of biphase modulation is the fact that every signalling pulse has a mid-bit transition. This means that timing recovery is not restricted to a special preamble located prior to the data fields, but may be continued throughout the entire servo sector. Consequently any such preamble may be shortened (as far as the requirements for timing recovery are concerned) thus conserving servo sector area.

In the following discussion, the implications of a servo format based on biphase modulation on servo bit-detection, PES amplitude estimation and timing recovery will be given. Further, performance bounds on bit detection for dibit signalling and biphase modulation are presented. It is shown that, for biphase, near-optimal performance is achieved by a simple demodulator based on a full-response linear equalizer (FRLE) and binary slicer. Also presented is the performance of a biphase demodulator based on a practical 5th order analog filter. Further, performance bounds for optimal PES amplitude estimation are compared with the performance of a demodulator based on the practical FRLE. A near-optimal timing recovery scheme is described and some simulation results are presented. In addition, the ability of the biphase FRLE to reject disturbances due to thermal asperities (TA's) and MR-head asymmetry is assessed. Finally, two alternative, high-density formats are described and assessed, one being a modified biphase format while the other employs an interleaved variant of biphase known as quad-phase.

Next, bit detection in dibit signalling will be discussed.

Figure 2:
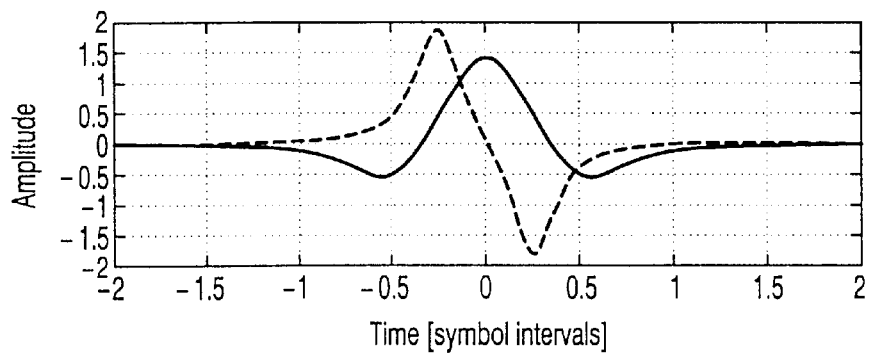
FIG. 2 shows a dibit response $h_b(t)$ (dashed) and output $-q_b(t)$ (solid) of the corresponding matched filter at a normalized information density D=0.3.

In existing servo demodulators, see D3, the replay signal is passed through a high-order low-pass filter (to reduce noise), after which a peak detector is used to detect the pulses produced by individual transitions. Thus, for data written using dibit signalling, the detection of two successive pulses of opposite polarity indicates the reception of a logical '1', while the absence of detected pulses indicates the reception of a logical '0'. A fundamentally more reliable, and in fact optimal, method of dibit detection is to use a filter matched to the dibit response $h_d(t)$, see D4. Provided that noise is white, the impulse response of the ideal matched filter is then given by $h_d(-t)$. For a Lorentzian head/media system with transition response $g(t)$ where $$g(t)=1/\{1+(2t/t_{50})^2\} \qquad (1)$$

and $t_{50}$ denotes the pulse width at half amplitude, the dibit response $h_d(t)$ may be expressed as $h_d(t)=g(t)-g(t-T/2)$. As shown in FIG. 2, for a typical normalized information density D=0.3, this matched filter produces a single, symmetrical pulse $q_d(t)$ in response to each transmitted dibit.

It may be seen that $q_d(t)$ is almost a Nyquist-1 pulse, i.e. that $q_d(kT)\approx 0$ for all $k\neq 0$. Only the first pre- and post-cursors $(q_d(\pm T))$ deviate significantly from zero and cause some intersymbol interference (ISI), but even so the eye pattern at the filter output will be almost perfectly binary. These observations lead to the synchronous detector architecture shown in FIG. 3.

Here the replay signal r(t), corresponding to a binary data sequence $a_k$, is applied to a servo filter, with impulse response p(t), that realizes the matched-filter. The output y(t) of this filter then consists of a series of pulses (corresponding to recorded dibits) which are sampled at their peaks to generate the discrete time sequence $y_k$. This sequence is applied to a binary slicer (with a non-zero threshold) to produce near-optimum decisions $\hat{a}_k$.

Next, bit detection in biphase modulation will be discussed.

The biphase magnetization pattern m(t) shown in FIG. 1 may be thought of as being obtained by linear pulse modulation of a binary data sequence $a_k$ according to $$m(t) = \sum_{k=-\infty}^{\infty} \{a_k \cdot c_b(t - kT)\}. \quad (2)$$

Here $a_k$ is a 'bipolar' version of the data sequence shown in FIG. 1, i.e. $a_k=+1$ for a logical '1', and $a_k=-1$ for a logical '0'. The function $c_b(t)$ represents the basic shape of a biphase signalling pulse and is given by $$c_b(t) = \begin{cases} 1 & \text{for } -T/2 < t < 0 \\ -1 & \text{for } 0 < t < T/2, \text{ and} \\ 0 & \text{else.} \end{cases} \quad (3)$$

Figure 4:
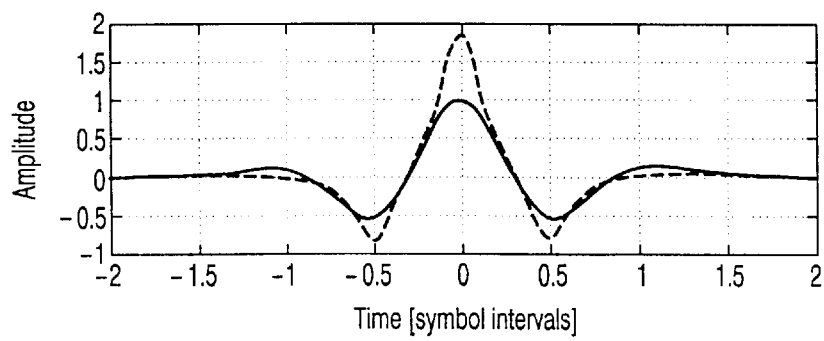
FIG. 4 shows the biphase response $h_b(t)$ (dashed) and output $-q_b(t)$ (solid) of the corresponding matched filter at a normalized information density D=0.3.

If the biphase symbol response, i.e. the response of the head/media system to the basic biphase signalling pulse $c_b(t)$, is denoted by $h_b(t)$, then the impulse response of the corresponding biphase matched-filter w(t) is given by w(t)= $h_b(-t)$, provided that noise is white. The output of this filter in response to $h_b(t)$ is again a single pulse $q_b(t)$, as shown in FIG. 4. Then the filter output y(t) in response to the biphase modulated data sequence $a_k$ will be $$y(t) = \sum_{k=-\infty}^{\infty} a_k \cdot q_b(t - kT), \quad (4)$$

i.e. a linear superposition of positive and negative pulses $q_b(t-kT)$. From FIG. 4 it may be seen that $q_b(t)$ is almost a Nyquist-1 pulse, and so the FIG. 3 architecture may be re-used to produce near optimum decisions $â_k$. The servo filter now realizes the biphase matched-filter i.e. p(t)=w(t) and the slicer has a threshold at zero in order to detect the polarity of the bipolar samples $y_k$. It should be further noted here, that D1 performs bit detection for bi-phase very differently, compared to the bit detection in accordance with the invention.

Next, a performance comparison between dibit signalling and bi-phase modulation will be given.

Figure 3:
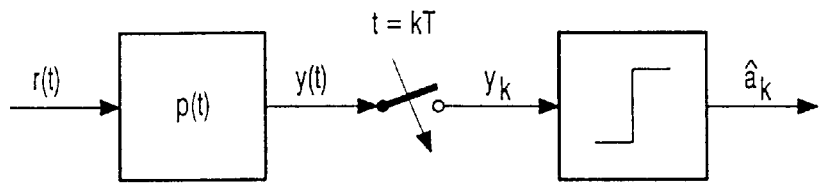
FIG. 3 shows a block diagram of the bit detector.

For both formats, the performance of the FIG. 3 detector may be evaluated by computing predetection SNR at the input of the binary slicer. This has been done analytically for the case where an isolated symbol is transmitted (i.e. ISI is neglected) and noise, at the input of the matched filter, is white. The results represent the {matched-filter bound} (MFB) on bit-detector performance. In general however, there will be some residual ISI at the input of the slicer. This may be suppressed by modifying the servo filter's impulse response such that q(t) is a Nyquist-1 pulse. In this case the servo filter is effectively a full-response linear equalizer (FRLE) and q(t) will be referred to as the equalized system response.

Figure 5:
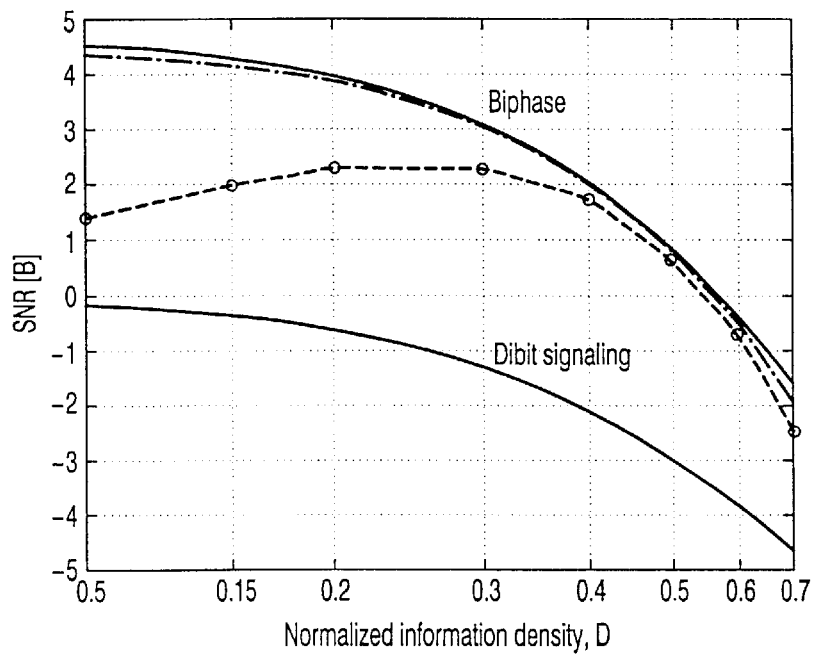
FIG. 5 shows the predetection signal-to-noise ratios for biphase and dibit signalling. Solid lines: matched-filter bounds; dashed lines: full-response linear equalizer with minimum noise enhancement; circles: RF-biphase detector.

Pre-detection SNR may be computed numerically for the FRLE with minimum noise enhancement, see chapter 5 in D5, and is compared in FIG. 5 with the MFB for various normalized information densities, D. The 0 dB level in FIG. 5 is the MFB for dibit signalling as density tends to zero. For the computations a fixed value for $t_{50}$ is assumed and $D=t_{50}/T$ is varied by changing the bit period T. From FIG. 5 it may be seen that the performance of the optimum biphase FRLE virtually coincides with the MFB.

Furthermore, for practical servo densities, e.g. in the range D∈[0.15 . . . 0.6], iphase SNR's are about 4 dB better than those for dibit signalling. Also shown is the performance of an RF-biphase detector based on a practical 5th order analog filter. Over the density range of interest the performance of this detector is superior even to the MFB for dibit signalling.

Next, PES demodulation will be discussed.

Figure 6:
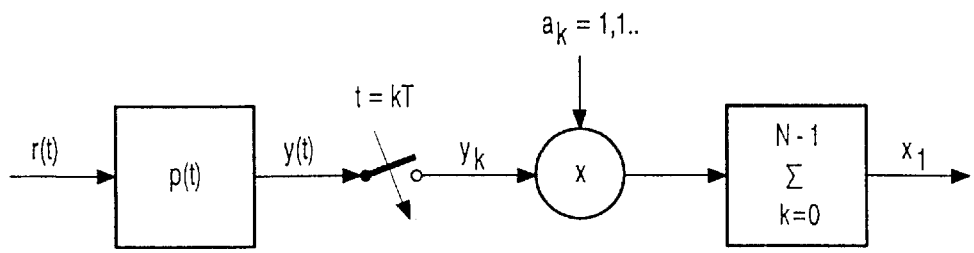
FIG. 6 shows a PES demodulator for biphase encoded signals.

Optimum amplitude estimation of the PES burst is in principle possible via a filter matched to the entire PES burst. However the PES burst may be regarded as the biphase modulated all-ones sequence, i.e. $a_k=+1,+1$ . . . Using this observation it is shown below that a completely equivalent PES amplitude estimate $\chi_1$ may be produced by integrating the product of the (a priori known) data and the sampled output of a filter matched to the biphase symbol response, over the duration of the burst. The resulting demodulator structure is shown in FIG. 6, and is closely akin to the FIG. 3 detector.

Figure 7:
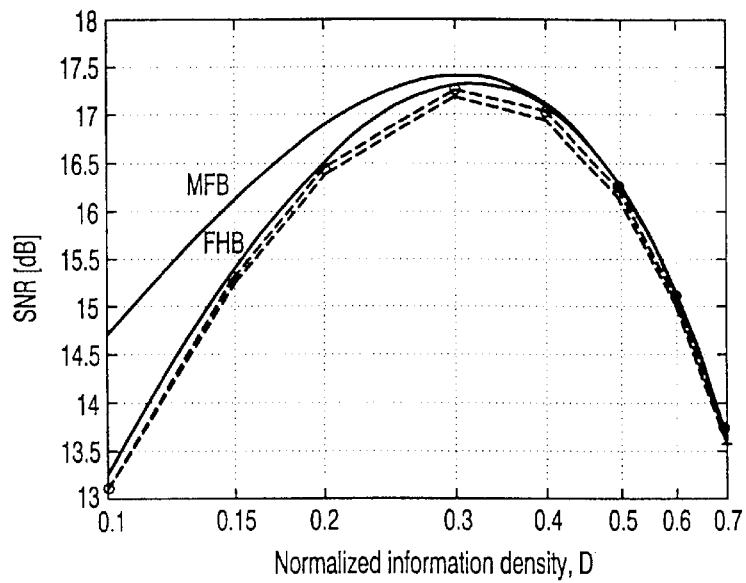
FIG. 7 shows signal-to-noise ratios of various PES demodulators. The PES burst consists of 22 cycles, the first and last cycles of which are not demodulated. Solid lines: MFB and FHB; circles: RF-biphase servo filter; crosses: area detector.
Figure 8:
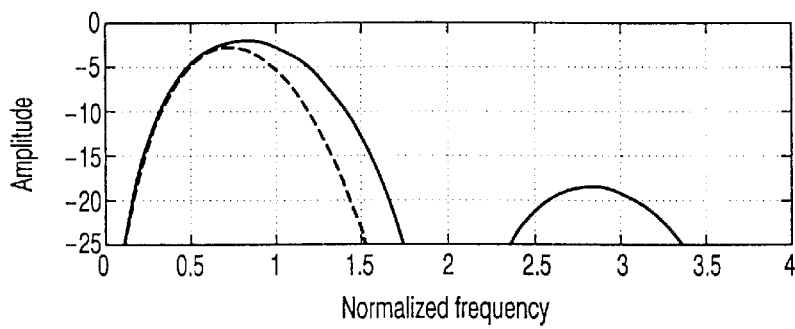
FIG. 8 shows amplitude-frequency characteristics at D=0.3 of the biphase symbol response (solid line), and of the RF-biphase servo filter (dashed lines)

The performance of servo filters matched either to the entire burst, or only to its fundamental frequency, has been computed analytically, see D2. These matched-filter and first harmonic bounds (denoted by MFB and FHB respectively) are shown in FIG. 7. Also shown is the simulated performance of a demodulator which uses the servo filter of the RF-biphase detector described below. The performance of this demodulator is virtually identical to the FHB. This is because the filter has a bandpass characteristic (see FIG. 8) and thus rejects the odd harmonics of the PES ' fundamental frequency, which increase in magnitude as density decreases.

A commonly used method of PES amplitude estimation is area detection, see D3 and D6. The performance of an area detector consisting of a 5th order Bessel low-pass filter with cut-off frequency 1.8/T, followed by a synchronous rectifier, is also shown in FIG. 7. The low-pass filter effectively suppresses the higher harmonics of the PES burst resulting in performance close to the FHB.

Next, timing recovery will be discussed.

The bit detection and PES demodulation schemes described above require accurate knowledge of sampling phase. If noise at the input of the receiver is white, this knowledge may be obtained in an optimum fashion by a timing-recovery loop based on the biphase matched-filter. The basic topology is shown in FIG. 9.

Here a servo filter with impulse response p(t) realizes the biphase matched-filter. Besides a main output y(t), used to produce bit decisions $â_k$ as in FIG. 3, the filter also has a second output which provides the derivative y'(t) of y(t). This derivative is sampled and multiplied with the bit-decisions $â_k$. The resulting cross-product excites a loop filter (LF) which provides the control signal for the voltage-controlled oscillator (VCO). A suitable initial phase for the VCO may be obtained at the beginning of the preamble, for example by a zero-phase start circuit operating on y'(t).

Figure 9:
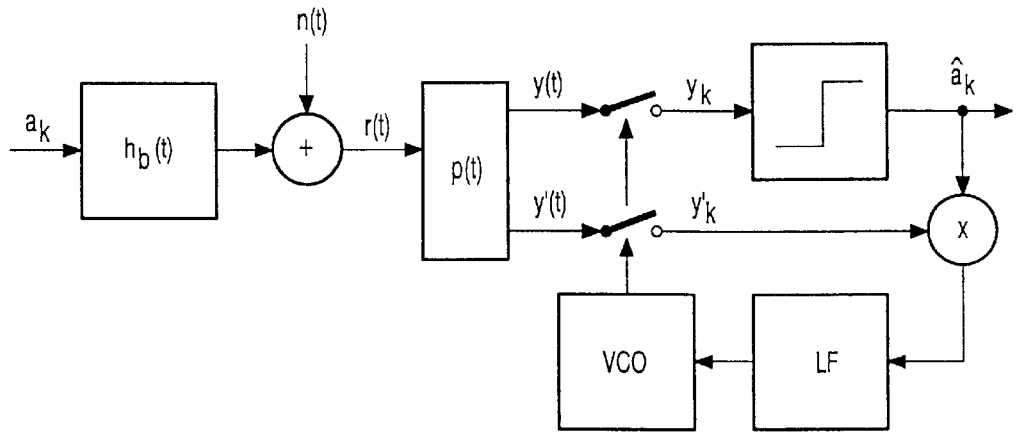
FIG. 9 shows an optimum timing recovery circuit for biphase signals.

Crudely speaking, the scheme of FIG. 9 attempts to find the sampling phase at which y(t) assumes its extremal values, or, equivalently, where y'(t) is zero. The scheme is of the maximum-likelihood variety and is optimum in the sense that it basically extracts all timing information that is fundamentally present in the replay signal r(t), see D5, chapters 9,10. This is true irrespective of the data $a_k$, provided only that the bit-decisions $â_k$ are correct. As such, timing recovery may be continued throughout the servo sector. The preamble and PES bursts are a special case in point. During these fields the data is known a priori and thus the multiplication with $â_k$ can be omitted, rendering the scheme insensitive to decision errors.

At the sampling instants $t_k=(k+\Delta)T$, where $\Delta$ is the sampling phase error expressed in units T, the loop is driven by the cross product (in the absence of decision errors)

$$a_k y'(t_k) = a_k \sum_{i=-\infty}^{\infty} \{a_i q'(t_k - iT) + a_k(n^* p)(t_k)\} \quad (5)$$

where q(t) is the equalized system response defined earlier. This cross-product has a noise component $u_k=a_k(n^*p)(t_k)$ that induces random jitter in the loop, and a data-dependent component $$z_k = a_k \sum_{i=-\infty}^{\infty} a_i q'(t_k - iT)$$

that provides the desired control information. Clearly $$z_k = a_k \sum_{j=-\infty}^{\infty} a_{k-j} q'((j+\Delta)T). \quad (6)$$

Figure 10:
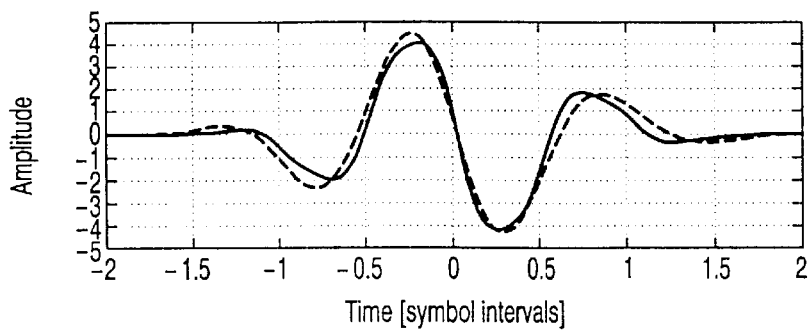
FIG. 10 shows the derivative of the equalized system response, i.e. q'(t), for the biphase matched-filter (solid lines) and the RF-biphase filter (dashed line) at D=0.3.

This signal will be averaged by the loop, thus for uncorrelated random data only the j=0 term provides control information, and the loop will attempt to force $q'(\Delta T)$ to zero, i.e. it will settle at the sampling phase for which q(t) assumes its peak. As shown in FIG. 10, where the time-axis is chosen such that $q'(t)=0$ at $t=0$, $q'(t)$ is approximately linear for small phase errors.

During the preamble and PES bursts $a_k=1$ and thus $$z_k = \sum_{j=-\infty}^{\infty} q'(j+\Delta T).$$

The desirable requirement that the loop settle at the same sampling phase as for random data is met when q'(t) is anti-symmetric about t=0. This is true for the matched filter, see FIG. 10, and by design, also holds for the RF-biphase servo-filter. For random data however, the fact that q'(jT)≠0 when j≠0, implies that there will be some pattern dependent jitter in the loop even when it is in tracking mode.

Figure 11:
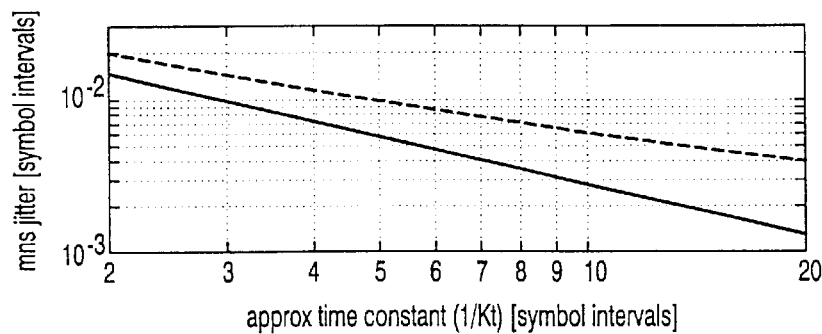
FIG. 11 shows jitter vs. time constant $1/K_t$ at D=0.3 for a first-order timing-recovery-loop, in the absence of noise (solid lines) and at a BER of $10^{-8}$ (dashed lines)

Simulations were carried out for a first-order timing-recovery-loop, i.e. one without a loop filter, employing the RF-biphase servo filter at a density of D=0.3. The loop is approximately linear for small phase errors and so has an exponential step response with time constant $1/K_t$, where $K_t$ is the loop gain. At the start of a servo sector the timing loop should acquire lock during the preamble, which might typically be 30 to 40 cycles long, and therefore loop time-constants of about 10 symbol intervals are of practical interest. The preamble is usually followed by several bits of random data ( e.g. track address, a synchronization word etc.) which will cause pattern dependent jitter in the loop. If loop gain is chosen appropriately however (see FIG. 11), such jitter will be effectively suppressed by the loop.

Noise at the input of the timing recovery loop will also give rise to jitter in the loop. A reasonable requirement for servo data, not protected by an error-correcting code, is that the bit-error rate (BER) be less than $10^{-8}$. For white noise at the input of a bit-detector based on the RF-biphase servo filter, this corresponds to a predetection SNR of 15.8 dB. For an appropriate choice of loop gain (see FIG. 11), total loop jitter at this noise level will be only slightly limited by the effects of pattern dependent jitter.

Next, thermal asperity handling will be discussed.

Figure 12:
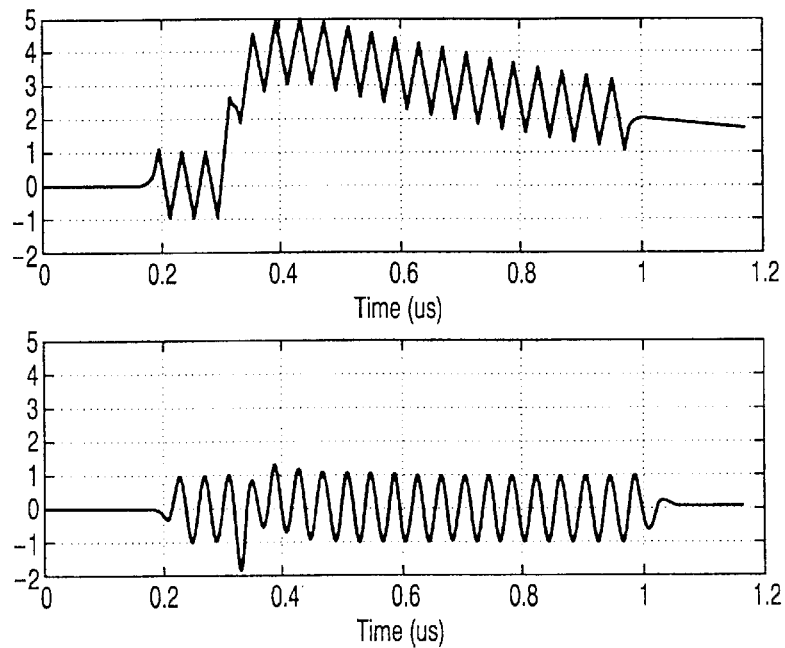
FIG. 12 shows a preamble with 4x asperity at input (top) and output (bottom) of the RF-biphase servo filter.

The RF-biphase filter has a double zero at DC and as such may be expected to effectively suppress thermal asperities (TA's). This is confirmed in FIG. 12 which shows the response of the filter to a 4× TA with rise and fall time constants of 25 and 800 ns respectively at a servo frequency of 25 MHz and a normalized information density D=0.3.

Next, MR asymmetry handling will be discussed.

Figure 13:
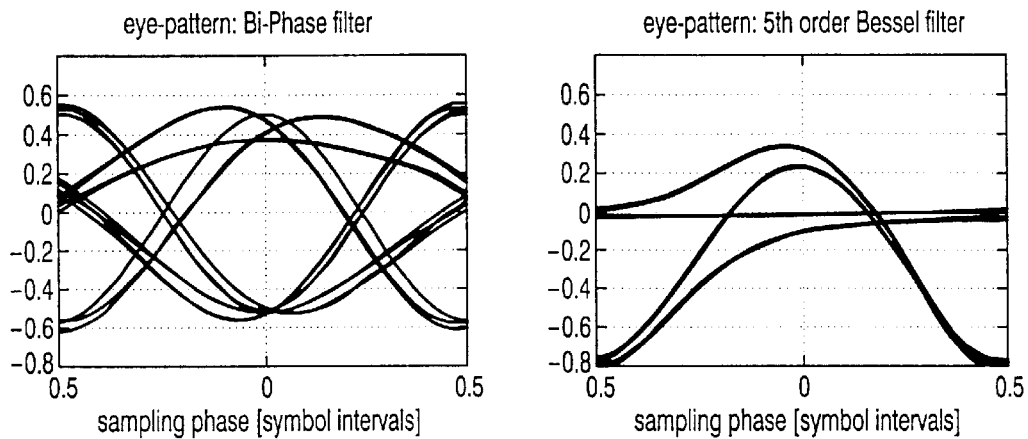
FIG. 13 shows the impact of an MR asymmetry of 30\% on eye patterns for biphase and dibit signalling at a normalized information density D=0.3.

MR-head asymmetries can be roughly modelled by using distinct amplitudes $A_p$ and $A_n$ for the positive and negative transition responses of the head/media system. In real systems the degree of asymmetry $|A_p-A_m|/|A_p+A_m|$ can be up to some 30%. It is clearly desirable that the entire demodulator be insensitive to such asymmetries. Conventional servo demodulators detect positive and negative pulses separately and are inherently sensitive to such asymmetries. The approach under study, by comparison, essentially involves a matched filter, which basically concentrates the compound effect of all transition responses within each bit cell at a single sampling phase. This concentration process, which is just a form of linear superposition, largely eliminates the effect of asymmetries. Noise-free eye-patterns before and after the 5th order biphase FRLE are shown in FIG. 13. Although some asymmetry is still visible in the eye-pattern after the filter, the eye remains sufficiently open to permit reliable bit detection in the presence of noise.

Next, some alternative high-density formats will be discussed.

Figure 14A:
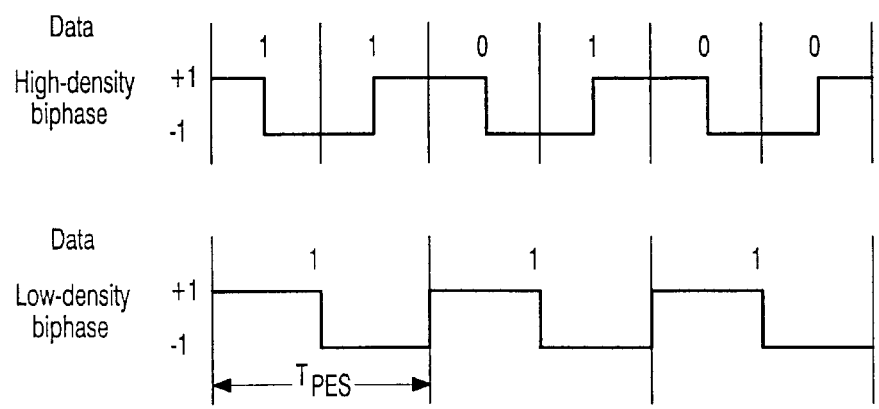
FIG. 14a shows high- and low-density biphase formats.

As was described previously, the PES burst may be regarded as the biphase modulated sequence $a_k=1,1,1 \ldots$ As shown in FIG. 14a (top), a PES burst may also be obtained by biphase modulating the data sequence $a_k=1,0,1,0 \ldots$ The resulting burst has a period equal to two symbol intervals. Thus for a given PES period (usually chosen to maximize PES SNR) the required symbol rate will be twice the burst frequency. This is in contrast with the format that utilizes the sequence $a_k=1,1,1 \ldots$ for the PES burst, for which the symbol rate is equal to the burst frequency. The two possible formats will be referred to as high- and low-density formats respectively reflecting the difference in symbol rates.

For a given PES period, $T_{PES}$, use of the high-density format implies a doubling of the normalized data information-density. This halves the length of the data field(s), at the expense of a substantial decrease in pre-detection SNR (see FIG. 15).

Figure 14B:
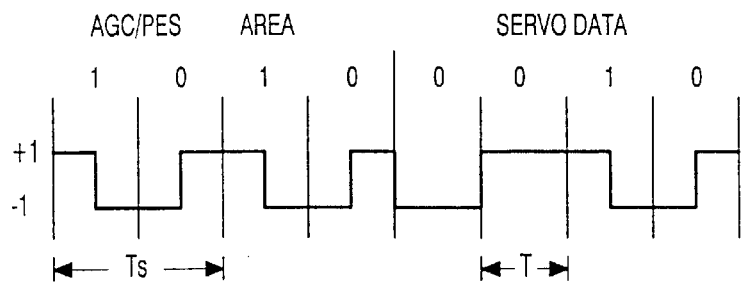
FIG. 14b shows a quad phase format.
Figure 15:
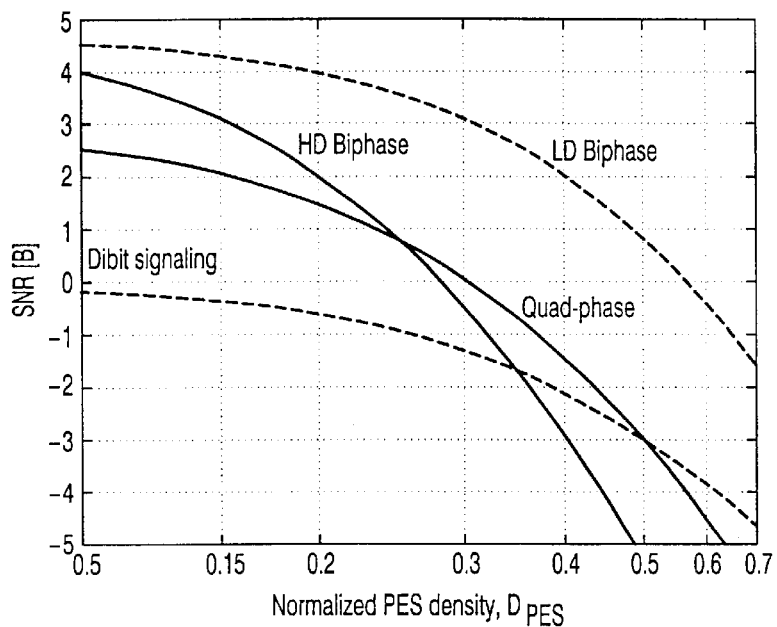
FIG. 15 shows matched filter bounds for various signalling formats as a function of normalized PES density, $D_{PES}=t_{50}/T_{PES}$. Solid lines: high density formats; dashed lines: low density formats.

Improved performance may be obtained by using a somewhat more complex signalling format known as quad-phase, see FIG. 14b. The example of the quad phase encoded bit sequence on the servo area, in combination with the generation of the frequency in the AGC field in FIG. 14b, satisfies the equation $f_{bit}=2 \cdot f_{AGC}$, see later, where $f_{bit}$ equals one of the bit frequencies $f_{Gray}$, $f_{sync}$ or $f_{AUX}$. Quad-phase is essentially an interleaved variant of biphase, and is also dc-free. Each pair of bits results in one or more transitions, that is the presence of timing content is still guaranteed. Just as for high-density biphase, a PES burst with period $T_{PES}=2T$ may be generated, in this case by quad-phase encoding the all ones (or all zeros) sequence. The matched filter bound for quad-phase is computed below and is shown in FIG. 15. For densities of practical interest, say within a factor of 2 from the optimum density D=0.32, quad-phase offers performance similar to that of dibit signalling but at twice the linear density and with guaranteed timing content. Near-optimum receiver structures for quad-phase are similar to the ones developed here but are somewhat more complicated, see for instance D7 and D8.

It is concluded that a servo format based on biphase modulation has been proposed. At the low linear densities typically employed for servo information, near maximum-likelihood PES demodulation, bit-detection and timing recovery are possible with a simple receiver based on an equalizer approximately matched to the biphase symbol response. The equalizer also provides excellent suppression of the effects of MR asymmetries and thermal asperities. When compared to a format based on dibit signalling, significant gains in pre-detection SNR (some 4 dB) and timing content are attained. Simulations of a receiver based on a $5^{th}$ order analog filter show that such performance may be closely approximated in practice.

Servo-data densities may be doubled by adopting a high-density biphase format, this however leads to a significant loss in SNR w.r.t dibit signalling. Improved performance is obtained with a quad-phase based format, but at the cost of increased receiver complexity.

Next, an SNR analysis for dibit signalling will be given.

Figure 16:
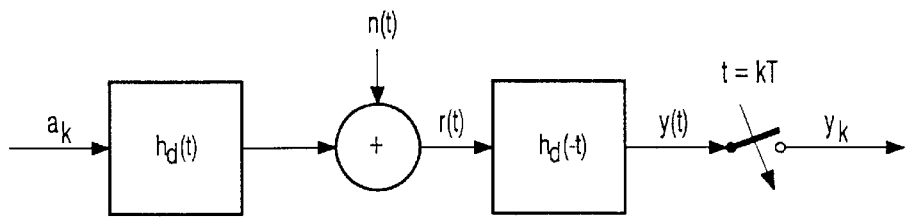
FIG. 16 shows a system model for dibit signalling.

A system model for matched-filter bit detection is shown in FIG. 16. Here binary data symbols $a_k \in \{1,0\}$ are conveyed via a linear pulse modulator with symbol response $$c_b(t) = \begin{cases} 2 & \text{for } 0 < t < T/2 \text{ and} \\ 0 & \text{elsewhere.} \end{cases} \quad (7)$$

Noise n(t) is assumed to be white with power spectral density $N_0$. The dibit response of the head/media system is $h_d(t)=2[g(t)-g(t-T/2)]$, where g(t) is the Lorentzian pulse defined in Eq. 1. Then the Fourier transform $H_d(\Omega)$ of $h_d(t)$ is $$H_d(\Omega) = \pi t_{50}[1-e^{\{-j\pi\Omega\}}]e^{\{-\pi|D|\}} \quad (8)$$

where $\Omega$ is a normalized measure of frequency, with $\Omega=1$ corresponding to the signalling rate 1/T. In response to a transmitted dibit, the output of the matched filter is a symmetric pulse with peak value A, which using Parsevals Theorem may be expressed as $$A = \int_{-\infty}^{\infty} h_d(t)^2 dt = 1/T \left[ \int_{-\infty}^{\infty} |H_d(\Omega)|^2 d\Omega \right]. \quad (9)$$

The noise variance at the output of the matched filter is then $$\sigma^2 = N_0 / T \left[ \int_{-\infty}^{\infty} |H_d(\Omega)|^2 d\Omega \right]. \quad (10)$$

Noting that there is no output when the symbol '0' is transmitted, bit decisions may be made with a binary slicer with threshold A/2. The predetection signal-to-noise ratio $SNR_d$ at the input of the slicer is then $$SNR_d = (A/2)^2/\sigma^2 = (1/4.N_0.T) \int_{-\infty}^{\infty} |H_d(\Omega)|^2 d\Omega. \quad (11)$$

And after some simplification we obtain $$SNR_d = \pi t_{50}/\{2 \cdot N_0 \cdot (1+(2D)^2)\}. \quad (12)$$

Next, an SNR analysis for biphase modulation will be given.

Using Eq. 3 the biphase symbol response $h_b(t)$ is given by $$h_b(t)=[g(t+T/2)-2g(t)+g(t-T/2)] \quad (13)$$

and its Fourier transform $H_b(t)$ is $$H_b(\Omega) = -4\pi t_{50} \sin^2(\pi\Omega/2)e^{\{-\pi D|\Omega|\}}. \quad (14)$$

The output of the biphase matched-filter consists of both positive and negative pulses, corresponding to the biphase symbols for logical '1' and '0'. Thus the binary slicer should have a threshold at zero. In this case the predetection signal-to-noise ratio $SNR_b$ is given by $$SNR_b = A^2/\sigma^2 = \{1/N_0T\} \int_{-\infty}^{\infty} |H_b(\Omega)| \wedge 2d\Omega. \quad (15)$$

This may be evaluated with the aid of integral tables to obtain $$SNR_b = 3\pi t_{50}/2N_0. \ (1+D^2)(1+2D)^2. \quad (16)$$

Next, an SNR analysis of quad-phase modulation will be given.

Quad-phase is a known linear binary modulation code with desirable properties for magnetic recording, see D9 and D10. Consider a binary stream $a_k$ with symbol rate 1/T which is subdivided into even and odd streams $a_m^0 = a_{2m}$ and $a_m^1 = a_{2m+1}$. Then the quad-phase encoded binary data signal $b_n$ at the data rate 2/T is given by $$b_{4m} = a_m^0, \ b_{4m+1} = a_m^1, \ b_{4m+2} = -a_m^0, \ b_{4m+3} = -a_m^1. \quad (17)$$

The basic shape of a quad-phase signalling pulse, denoted by $c_{qp}(t)$, may then be expressed as, $$c_{qp}(t) = \begin{cases} 1 & \text{for } -3T/4 < t < -T/4, \\ -1 & \text{for } T/4 < t < 3T/4, \text{ and} \\ 0 & \text{else.} \end{cases} \quad (18)$$

The quad-phase symbol response $h_{qp}(t)$, i.e. the response of the channel to a quad-phase signalling pulse, is given by $$h_{qp}(t) = [g(t+3T/4) - g(t+T/4) - g(t-T/4) + g(t-3T/4)] \quad (19)$$

and its Fourier transform $H_{qp}(t)$ is $$H_{qp}(\Omega) = \pi t_{50}(\cos(3\pi\Omega/4)) - \cos(\pi\Omega/4))e^{\{-\pi D|\Omega|\}}. \quad (20)$$

As for biphase, the predetection signal-to-noise ratio $SNR_{qp}$ is given by $$SNR_{qp} = A^2/\sigma^2 = (1/N_0T) \int_{-\infty}^{\infty} |H_{qp}(\Omega)|^2 d\Omega, \quad (21)$$

which after some simplification results in $$SNR_{qp} = (3\pi t_{50}/N_0). \ (1/1+(2D)^2). \ (1/1+4(2D)^2. \ (3+32D^2)/(9+4(2D)^2) \quad (22)$$

Next, an RF-biphase detector will be described.

Figure 17:
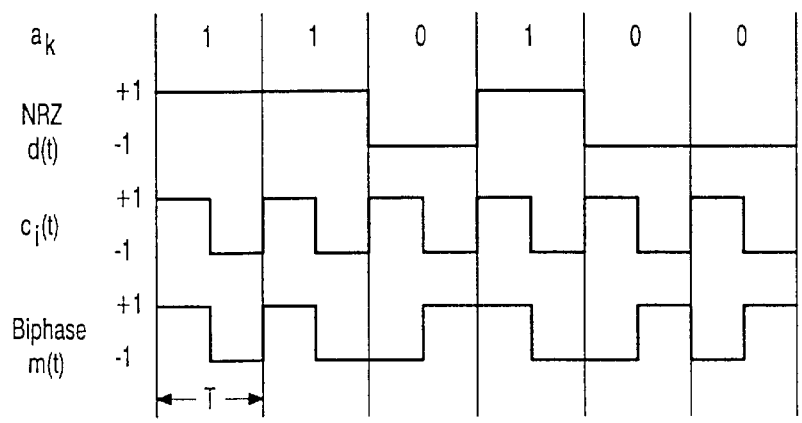
FIG. 17 shows an RF interpretation of biphase
Figure 18:
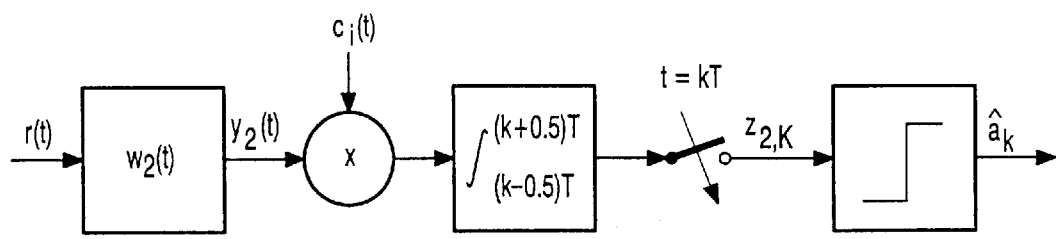
FIG. 18 shows an RF-biphase detector.

The basic observation that underlies this approach is that biphase can be regarded as an 'RF-modulated' version of NRZ, as shown in FIG. 17. Here an NRZ signal d(t) is multiplied by a synchronous, binary, clock signal $c_t(t)$ of period T to yield the biphase signal m(t). This interpretation of biphase indicates that demodulation/detection can be performed in the following manner (see D11): first the received biphase signal is 'synchronously demodulated' by multiplication with the clock signal $c_t(t)$, which has a clock frequency equal to $n.f_{AGC}$ (see later), then bit-detection is performed in a manner adapted to NRZ. The latter step basically requires an integrate-and-dump filter. This leads to the detector topology of FIG. 18. Here the replay signal r(t) is filtered by a servo filter with impulse response $w_2(t)$. The filter output is synchronously multiplied with the in-phase clock $c_i(t)$ and integrated across successive, T second wide, intervals. At the end of each interval, the sign of the integrand is determined and serves as the bit-decision.

Mathematically, decision variable $Z_{2,k}$ can be expressed as $$Z_{2,k} = \int_{(k-0.5)T}^{(k+0.5)T} y_2(t)c_i(t)dt = \int_{(k-0.5)T}^{kT} y_2(t)dt - \int_{kT}^{(k+0.5)T} y_2(t)dt. \quad (23)$$

where the instances kT correspond to signalling-pulse centers. This may be further simplified in terms of the elementary biphase symbol $c_b(t)$ defined in Eq.3. Then $$Z_{2,k} = \int_{-\infty}^{\infty} y_2(t)c_b(t-kT)dt = (y_2 * c_b)(kT) = (r * w_2 * c_b(-t))(kT) \quad (24)$$

where '*' denotes convolution. This analysis shows that the FIG. 18 topology is equivalent to that of FIG. 3 provided that the impulse responses $w_2(t)$ and p(t) are related by $p(t)=(w_2*c_b(-t))(t)$. When this condition holds, the FIG. 18 topology (slicer excluded), may be seen to be an alternative way of realizing a servo filter with impulse response p(t). This equivalent servo filter will be referred to as the RF-biphase servo filter.

If the servo filter is to be matched to the biphase symbol response, i.e if $p(t)=h_b(-t)$, then equivalence of the two topologies is obtained when $w_2(t)=f(-t)$, where f(t) is the impulse response of the magnetic recording channel. Performance of the FIG. 18 topology will then depend on the accuracy to which $w_2(t)=f(-t)$ may be realized, since the other blocks may be realized relatively accurately. This task is however considerably less complex than that of directly realizing $h_b(t)$, since the cascade of the synchronous demodulator and the integrate-and-dump filter in the FIG. 18 topology effectively realizes part of the desired response. One way of realizing $w_2(t)$ is with a 5th order analog filter made up of a 1st order high-pass filter and two 2nd order low-pass filters. Optimum filter parameters were determined by a computer program that optimizes predetection SNR via a simplex search (see Table I).

TABLE I

Optimum filter parameters for various normalized information densities D. Notation: $\Omega_c$ denotes cut-off frequency for the first-order section, and resonance frequency for second-order sections (frequencies are normalized such that $\Omega = 1$ at the signalling rate 1/T; Q denotes quality factor.

| | HP$_1$ | LP$_1$ | | LP$_2$ | |
|---|---|---|---|---|---|
| D | $\Omega_c$ | $\Omega_c$ | Q | $\Omega_c$ | Q |
| 0.15 | 0.36 | 0.80 | 0.84 | 1.23 | 1.14 |
| 0.3 | 0.39 | 0.86 | 0.85 | 1.33 | 1.16 |
| 0.6 | 0.47 | 1.04 | 0.93 | 1.61 | 1.26 |

Next, an optimum PES demodulation will be described.

The magnetization pattern m(t) of a PES burst may be modelled as $$m(t) = \sum_{k=0}^{N-1} a_k c_b(t-kT) \quad (25)$$

where $a_k$ is the (bipolar) data sequence used to generate the PES burst, N denotes the number of cycles in the PES burst and c(t) is the biphase or dibit symbol response. The corresponding replay signal r(t) is a filtered and noisy version of m(t) according to r(t)=Ax(t)+n(t) where A is the burst amplitude and $$x(t) = \sum_{k=0}^{N-1} a_k h_b(t-kT). \quad (26)$$

Optimum PES demodulation is possible by applying r(t) to a filter whose impulse response is matched to the entire PES burst. If n(t) is white this implies that d(t)=x(-t). The matched-filter output v(t) is sampled at instant t=0 to obtain an optimum PES estimate v(0). Then $$v(0) = \int_{-\infty}^{\infty} r(t)d(-t)dt = \int_{-\infty}^{\infty} r(t)x(t)dt \quad (27)$$
$$= \sum_{k=0}^{N-1} \int_{-\infty}^{\infty} r(t)a_k h_b(t-kT)dt$$
$$= \sum_{k=0}^{N-1} a_k y(kT)$$

where y(t) may be recognized as the output of a filter with impulse response h(-t) operating on r(t). This is just the matched filter described above.

Figure 19:
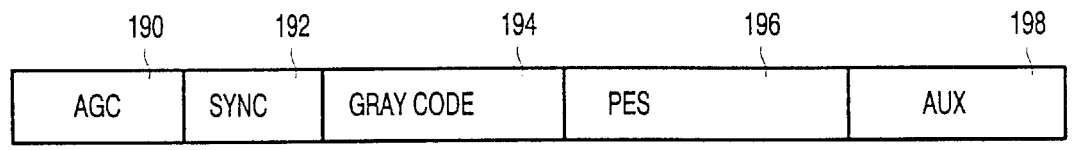
FIG. 19 shows the format of the servo field, FIG. 20 a hard disk provided with servo fields alternating with data fields in the tracks.
Figure 20:
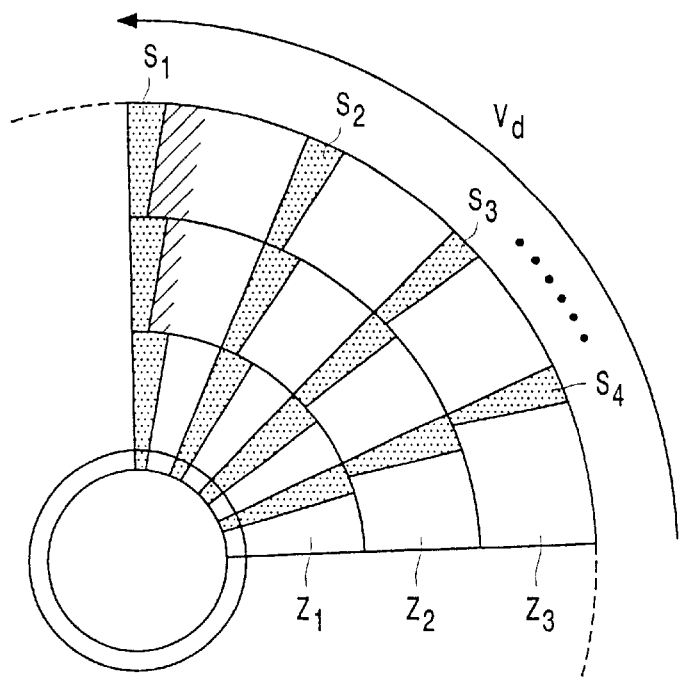

Next, a format of the servo fields of the hard disk in accordance with the invention will be described. FIG. 19 shows an example of such format. A servo field comprises an AGC field 190, in which an AGC signal has been stored, a sync field 192 in which an encoded synchronization bit sequence has been stored, a Gray code field 194 in which an encoded Gray bit sequence has been stored, a PES field 196 in which a position tracking signal has been stored and an auxiliary field 198 in which auxiliary servo related data has been stored, such as data related to repeatable run-out, disk-head characteristics, etc.

The AGC field comprises an AGC signal in the form of a sequence of dibits. Writing the AGC signal in the AGC field with the hard disk rotating at the predetermined rotational speed is done by writing a square wave signal having a frequency $f_{AGC}$ in this field. When reading the AGC signal from the hard disk with the hard disk rotating at the same predetermined rotational speed, a sinusoidal-like reproduction signal is realized having the frequency $f_{AGC}$.

The sync field 192 comprises an encoded synchronization bit sequence that, in accordance with the invention, is a synchronization bit sequence which is preferably bi-phase encoded or quad-phase encoded. More generally, it can be stated that the synchronization bit sequence is p-phase encoded where p>2. Further, the encoded synchronization bit sequence in a servo field has a bitfrequency $f_{sync}$ that satisfies the following relationship:

$$f_{sync}/f_{AGC}=n_1$$

where $n_1$ is an integer for which holds $n_1 \geq 1$. More specifically, $n_1$ equals 1 or 2. As an example, in FIG. 1, $n_1=1$, whereas in FIG. 14 (top), $n_1=2$.

The Gray code field 194 comprises an encoded Gray bit sequence that identifies the track in which the servo field is. The Gray bit sequence is again preferably bi-phase encoded or quad-phase encoded form. More generally, it can be stated that the encoded Gray bit sequence has a bitfrequency $f_{Gray}$, that satisfies the following relationship:

$$f_{Gray}/f_{AGC}=n_2,$$

where $n_2$ is an integer for which holds $n_2>1$. More specifically, $n_2$ equals again 1 or 2, as explained above. Typically, $n_1=n_2$.

The PES field 196 generally has the same frequency as the AGC field 190. The AUX field 198 is encoded in the same way as the Gray code field 194 and the sync field 192. That means that the auxiliary bit sequence is preferably in bi-phase encoded or quad-phase encoded form. More generally, it can be stated that the encoded auxiliary bit sequence has a bitfrequency $f_{AUX}$, that satisfies the following relationship:

$$f_{AUX}/f_{AGC}=n_3,$$

where $n_3$ is an integer for which holds $n_3>1$. More specifically, $n_3$ equals again 1 or 2, as explained above. Typically, $n_1=n_2=n_3$.

By merging the bit-detection, timing-recovery and PES-demodulation schemes described above, the servo demodulator circuit of FIG. 21 can be obtained. The circuit diagram of FIG. 21 is merely meant to indicate principles and does not reflect all functionality that will be required in the actual demodulator, nor does it accurately reflect the block diagram of the actual demodulator.

Figure 21:
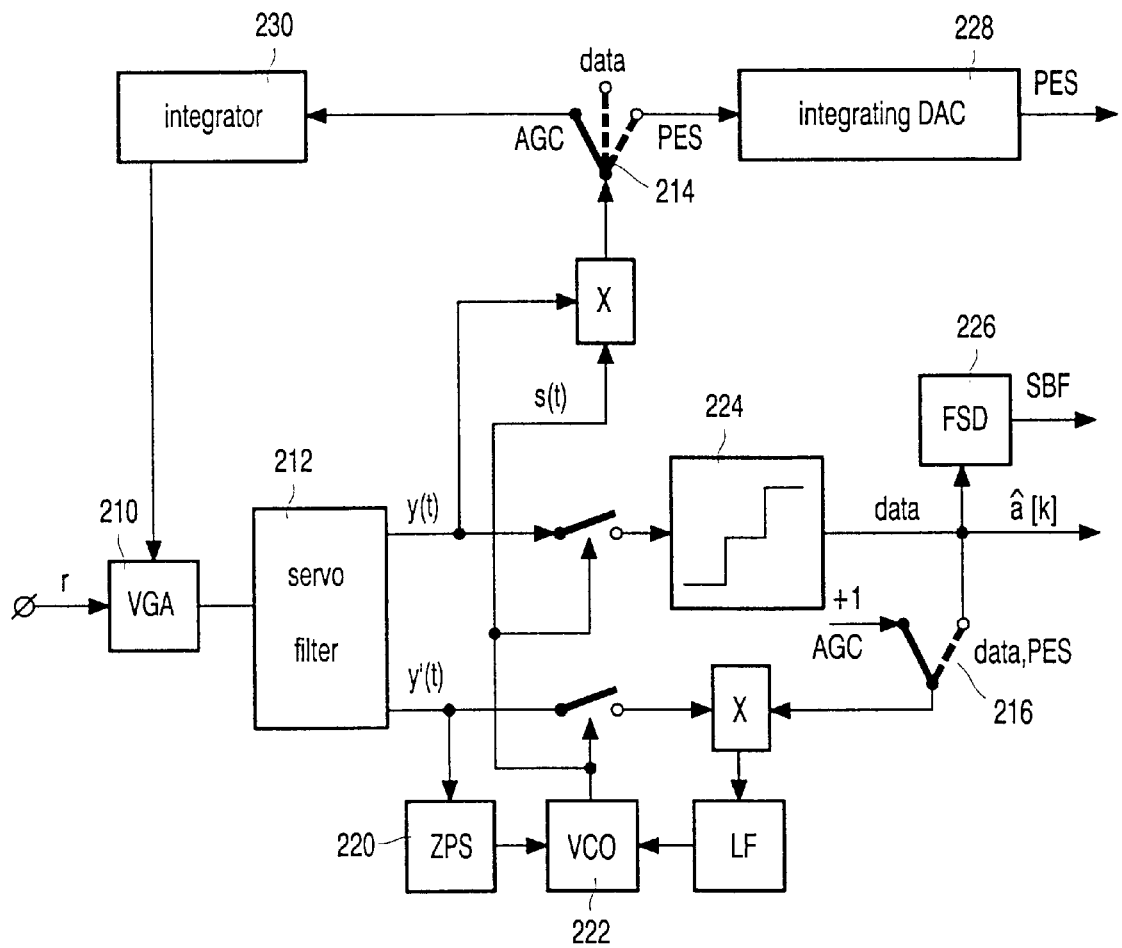
FIG. 21 shows a circuit diagram of a servo demodulator for bi-phase encoded signals.

The two switches 214 and 216 in FIG. 21 change position between various fields of the servo burst (or servo field), and their initial position (meant for the AGC field) is indicated. The replay signal r is applied to a variable-gain amplifier (VGA) 210 that forms part of the AGC loop. The servo filter 212 operates on the VGA output and has a principal output y that is used for automatic gain control, bit-detection and PES demodulation, as well as an auxiliary output y' that is used for timing recovery. A zero-phase start (ZPS) circuit 220 operates on y' to provide a suitable initial VCO phase at the beginning of the AGC field. From that point on VCO control is based on the sampled derivative of y.

During the AGC field, y is multiplied with the binary VCO output s(t), which is he clock signal derived, to obtain a control signal for the AGC. Towards the end of the AGC field, the two switches 214 and 216 are put in the 'data' position. As a result, the VGA gain is frozen, and VCO control is based on the cross-product of the sampled version of y' and the detected data â[k]. The latter sequence is obtained via a bit-detector 224 with erasure zone (or a ternary slicer), and becomes zero whenever decisions are unreliable. In these events the PLL will 'freeze' dynamically. A frame-sync detector (FSD) 226 operating on â[k] serves to identify the frame-sync mark.

At the beginning of the first PES burst, the switch 214 is put in the 'PES' position to permit an integrating DAC 228 to form a digital PES estimate. This integrating DAC is accurately matched to the integrator 230 in the AGC loop. The second PES estimate is obtained in the same manner. The PLL continues to operate in a decision-directed mode beyond the AGC field.

An equivalent circuit diagram can be obtained for detecting quad phase encoded signals stored in the servo fields. The major difference is that now two ternary slicers are required, for the following reason. Detection of quad phase encoded signals is carried out by separately detecting and processing the even and odd numbered bits in the data sequence. This is done in parallel and with a shift in time for the odd bits compared to the even bits. One implication is that two ternary slicers are required.

Various differences can be identified between D1 and the present invention. Firstly, D1 relates to 'wide bi-phase', whereas the present invention relates to bi-phase. Further, in accordance with the invention, a relationship has been established between the frequency $f_{AGC}$ and the bit frequency in the Gray code field, the sync field and the auxiliary field. In D1, a relationship has been established between the bit frequency in the Gray code field and the bit frequency of the user data in the data fields. Further, in D1, an existing read channel circuit for the detection of the user data in the data fields has been converted into a circuit for detecting bi-phase encoded data in the servo fields. In accordance with the invention, however, a specially built circuitry has been developed for detecting p-phase encoded data in the servo fields, resulting in additional advantages, such as the possibility to derive the clock signal throughout the servo fields. This permits, amongst others, the use of a bandpass filter for the servo filter 212 in FIG. 21, as compared to D1, which uses a lowpass filter at the same position. The circuit of FIG. 21 is therefore less sensitive to DC offsets and occurring asperities, and therefore exhibits a higher signal to noise ratio.

Whilst the invention has been described with reference to preferred embodiments thereof, it is to be understood that these are not limitative examples. Thus, various modifications may become apparent to those skilled in the art, without departing from the scope of the invention, as defined by the claims. Further, any reference signs do not limit the scope of the claims. The invention, as far as incorporated in the reading apparatus, can be implemented by means of both hardware and software, and several "means" may be represented by the same item of hardware. The word 'comprising' does not exclude the presence of other elements or steps than those listed in a claim. Also, the word "a" or "an" preceding an element does not exclude the presence of a plurality of such elements. In addition, the invention lies in each and every novel feature or combination of features.

RELATED DOCUMENTS (D1) U.S. Pat. No. 5,661,760
(D2) A. Patapoutian, 'Optimal Burst Frequency Derivation for Head Positioning', IEEE Trans. Magn., Vol.32, No.5, pp.3899–3901, September 1996.
(D3) L. Frederikson et al., 'Digital servo processing in the Venus PRML read/write channel', IEEE Trans. Magn., Vol.33, No.5, pp.2617–2619, September 1997.
(D4) H. Yada and T. Takeda, 'A coherent maximum likelihood head position estimator for PERM disk drives', IEEE Trans. Magn., Vol.32, No.3, pp.1867–1872, May 1996.
(D5) J. W. M. Bergmans, Digital Baseband Transmission and Recording}. Boston, Kluwer Academic Publishers, 1996.
(D6) D. E. Reed, W. G. Bliss, L. Du and M. Karsanbhai, 'Digital servo processing in a digital read channel', IEEE Trans. Magn., Vol.34, No.1, pp.13–16, January 1998.
(D7) J. W. M. Bergmans and C. Mita, 'Two new equalization schemes for high-density digital magnetic recording systems with quad-phase modulation code', Electron. Letters, Vol.26, No.1, pp.13–14, January 1990.
(D8) J. W. M. Bergmans, 'Baud-rate data-aide timing recovery for digital magnetic recording systems with quadra-phase modulation code', Trans. Comm., Vol.43, No.6, pp.2012–15, June. 1995.
(D9) J. A. Bixby and R. A. Ketcham, 'Q. P., an improved code for high density digital recording', IEEE Trans. Magn., Vol.MAG-15, No.6, pp.1465–1467, November 1979.
(D10) P. J. van Gerwen, W. A. M. Snijders and N. A. M. Verhoeckx, 'Dual digital transmission system for multi-pair cables based on crank-shaft coding', Electron. Letters, Vol.20, No.15, pp.619–621, July 1984.
(D11) U.S. Pat. No. 5,175,507.

What is claimed is:

1. Disk apparatus, preferably a hard disk apparatus, comprising a disk provided with a plurality of tracks running parallel to each other on the disk, a track comprising servo fields alternating with data fields, a servo field comprising an AGC field having an AGC signal recorded in it and a Gray code field having an encoded Gray bit sequence recorded in it, a data field for recording a data information signal in it, wherein a ratio of AGC signal frequency and Gray bit sequence bitfrequency, is an integer greater than zero and that the Gray bit sequence is encoded in accordance with a p-phase modulation code, where p is an integer greater than one.

2. Disk apparatus as claimed in claim 1, characterized in that the ratio is two.

3. Disk apparatus as claimed in claim 1, characterized in that the encoded Gray bit sequence is a bi-phase encoded bit sequence.

4. Disk apparatus as claimed in claim 1, characterized in that the encoded Gray bit sequence is a quad-phase encoded bit sequence.

5. Disk apparatus as claimed claim 1 characterized in that the servo field is devoid of a zero phase restart field.

6. Disk apparatus as claimed in claim 3, characterized in that the apparatus is provided with
   reading means for reading information from a track on the disk,
   bandpass filter means for bandpass filtering the information read from said track,
   detection means for detecting the Gray bit sequence from the bandpass filtered information.

7. Disk apparatus as claimed in claim 6, characterized in that the apparatus further comprising means for deriving a clock signal from the encoded Gray bit sequence stored in the Gray code field.

8. Disk apparatus as claimed in claim 7, characterized in that the deriving means are further adapted to derive the clock signal from the encoded synchronization bit sequence stored in the sync field.

9. Disk apparatus as claimed in claim 7, the servo field further comprising a position error signal (PES) field, characterized in that the deriving means are further adapted to derive the clock signal from the signal stored in the PES field.

10. Disk apparatus as claimed in claim 9, characterized in that the deriving means comprise at least one ternary slicer.

11. Disk apparatus as claimed in claim 3, characterized in that the apparatus is provided with
    reading means for reading information from a track on the disk,
    bandpass filter means for bandpass filtering the information read from said track,
    synchronous demodulator means for synchronously demodulating said bandpass filtered information.

12. Disk apparatus as claimed in claim 11, characterized in that said synchronous demodulator means comprise clock signal generator means for generating a clock signal having a frequency equal to the integer.

13. Disk apparatus, preferably a hard disk apparatus, comprising a disk provided with a plurality of tracks running parallel to each other on the disk, a track comprising servo fields alternating with data fields, a servo field comprising an AGC field having an AGC signal recorded in it and a sync field having an encoded synchronisation bit sequence recorded in it, a data field for recording a data information signal in it, wherein the ration of AGC signal frequency and synchronization bit sequence bitfrequency $f_{sync}$ is an integer greater than zero, and that the synchronization bit sequence is encoded in accordance with a p-phase modulation code, where p is a interger greater than one.

14. Disk apparatus as claimed in claim 13, characterized in that the encoded synchronization bit sequence is a bi-phase encoded bit sequence.

15. Disk apparatus as claimed in claim 13, characterized in that the encoded synchronization bit sequence is a quad-phase encoded bit sequence.

16. Disk apparatus, preferably a hard disk apparatus, comprising a disk provided with a plurality of tracks running parallel to each other on the disk, a track comprising servo fields alternating with data fields, a servo field comprising a AGC field having a AGC signal recorded in it and an auxiliary field having an encoded auxiliary bit sequence recorded in it, a data field for recording a data information signal in it, wherein a ration a AGC signal frequency and auxiliary bit sequence bitfrequency is an interger greater than zero, and that the auxiliary bit sequence is encoded in accordance with a p-phase modulation code, where p is an integer greater than one.

17. Disk apparatus as claimed in claim 16, characterized in that the encoded auxiliary bit sequence is a bi-phase encoded bit sequence.

18. Disk apparatus as claimed in claim 16, characterized in that the encoded auxiliary bit sequence is a quad-phase encoded bit sequence.

* * * * *

Disclaimer

6,515,812 B1 — Johannes Wilhelmus Maria Bergmans, Eindhoven (NL); Kofi Afolabi Anthony Makinwa, Delft (NL); Johannes Otto Voorman, Eindhoven (NL). SERVO FORMAN FOR HARD DISKS PREFERABLY HARD DISKS. Patent dated February 4, 2003. Disclaimer filed March 28, 2008, by the assignee, Koninklijke Philips Electronics N.V.

Hereby enters this disclaimer to all claims of said patent.
*(Official Gazette, April 7, 2009)*